(12) United States Patent
Okano et al.

(10) Patent No.: US 9,637,160 B2
(45) Date of Patent: May 2, 2017

(54) STEERING SYSTEM

(71) Applicant: JTEKT CORPORATION, Osaka-shi, Osaka (JP)

(72) Inventors: Ryota Okano, Hamamatsu (JP); Masayoshi Sakuda, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/996,810

(22) Filed: Jan. 15, 2016

(65) Prior Publication Data

US 2016/0214638 A1    Jul. 28, 2016

(30) Foreign Application Priority Data

Jan. 22, 2015    (JP) .................................. 2015-010479

(51) Int. Cl.
*B62D 1/185*    (2006.01)
*B62D 1/184*    (2006.01)

(52) U.S. Cl.
CPC ............. *B62D 1/185* (2013.01); *B62D 1/184* (2013.01)

(58) Field of Classification Search
CPC ................................ B62D 1/185; B62D 1/184
See application file for complete search history.

(56) References Cited

U.S. PATENT DOCUMENTS

| | | | |
|---|---|---|---|
| 8,256,322 B2 * | 9/2012 | Takezawa | B62D 1/184 280/775 |
| 8,967,017 B2 * | 3/2015 | Osawa | B62D 1/184 280/775 |
| 9,145,161 B2 * | 9/2015 | Nagasawa | B22D 19/045 |
| 2006/0028010 A1 * | 2/2006 | Yamada | B62D 1/184 280/775 |
| 2013/0213174 A1 * | 8/2013 | Suzuki | B62D 1/187 74/493 |
| 2014/0076091 A1 | 3/2014 | Yokota et al. | |

FOREIGN PATENT DOCUMENTS

| | | |
|---|---|---|
| EP | 1 529 713 A2 | 5/2005 |
| EP | 2 647 545 A1 | 10/2013 |
| JP | 2014-058200 A | 4/2014 |

OTHER PUBLICATIONS

May 23, 2016 extended Search Report issued in European Patent Application No. 16151946.7.

* cited by examiner

*Primary Examiner* — Drew Brown
(74) *Attorney, Agent, or Firm* — Oliff PLC

(57) ABSTRACT

An outer jacket externally fitted over an inner jacket so as to be slidable in an axial direction relative to the inner jacket has a slit extending straight from an opening formed at a jacket end. A recessed portion is formed at an inner edge of the slit such that a slit width at an inside diameter portion of the outer jacket is larger than a slit width at an outside diameter portion of the outer jacket. An amount of recess of the recessed portion in a circumferential direction of the outer jacket continuously decreases from the opening end to an area end.

2 Claims, 5 Drawing Sheets

STEERING SYSTEM

INCORPORATION BY REFERENCE

The disclosure of Japanese Patent Application No. 2015-010479 filed on Jan. 22, 2015 including the specification, drawings and abstract, is incorporated herein by reference in its entirety.

BACKGROUND OF THE INVENTION

1. Field of the Invention

The present invention relates to a steering system.

2. Description of Related Art

A steering system has been proposed, in which a lateral pair of outer column halves is sandwiched between fixed side portions of a fixed bracket such that an inner column is clasped by clasping surface portions of the outer column halves, thus achieving locking (see, for example, Japanese Patent Application Publication No. 2014-58200 (JP 2014-58200 A)). On the other hand, a steering system is available, in which an ended slit is formed in a tubular outer jacket so as to extend straight from a jacket end in an axial direction and in which a clamp mechanism is used to reduce the outer jacket in diameter to allow the outer jacket to hold an inner jacket, thus achieving telescopic locking.

When the straight slit is formed in the tubular outer jacket as in the latter steering system, a holding force exerted on the inner jacket by the outer jacket varies in accordance with an axial position. When an area where a high holding force is locally exerted is present between the jackets, the jackets may fail to slide smoothly on each other during telescopic adjustment or impact absorption.

SUMMARY OF THE INVENTION

An object of the present invention is to provide a steering system that restrains a holding force exerted on an inner jacket by an outer jacket from varying in accordance with an axial position.

A steering system according to an aspect of the present invention includes: a column jacket including a tubular inner jacket, and a tubular outer jacket that is externally fitted over the inner jacket so as to be slidable in an axial direction relative to the inner jacket and that is provided with a slit extending straight from an opening end formed at a jacket end to an extension end in the axial direction such that the outer jacket is elastically reduced in diameter to hold the inner jacket, the column jacket supporting a steering shaft such that the steering shaft is rotatable; and a clamp mechanism that clamps a pair of clamped portions integrated with the outer jacket to cause the outer jacket to clamp the inner jacket such that the inner jacket is immovable in the axial direction. In an axial area from the opening end of the slit to an area end apart from the opening end in the axial direction, a recessed portion is formed at an inner edge of the slit such that a slit width at an inside diameter portion of the outer jacket is larger than a slit width at an outside diameter portion of the outer jacket. An amount of recess of the recessed portion in a circumferential direction of the outer jacket decreases continuously or in a stepped manner from the opening end to the area end.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
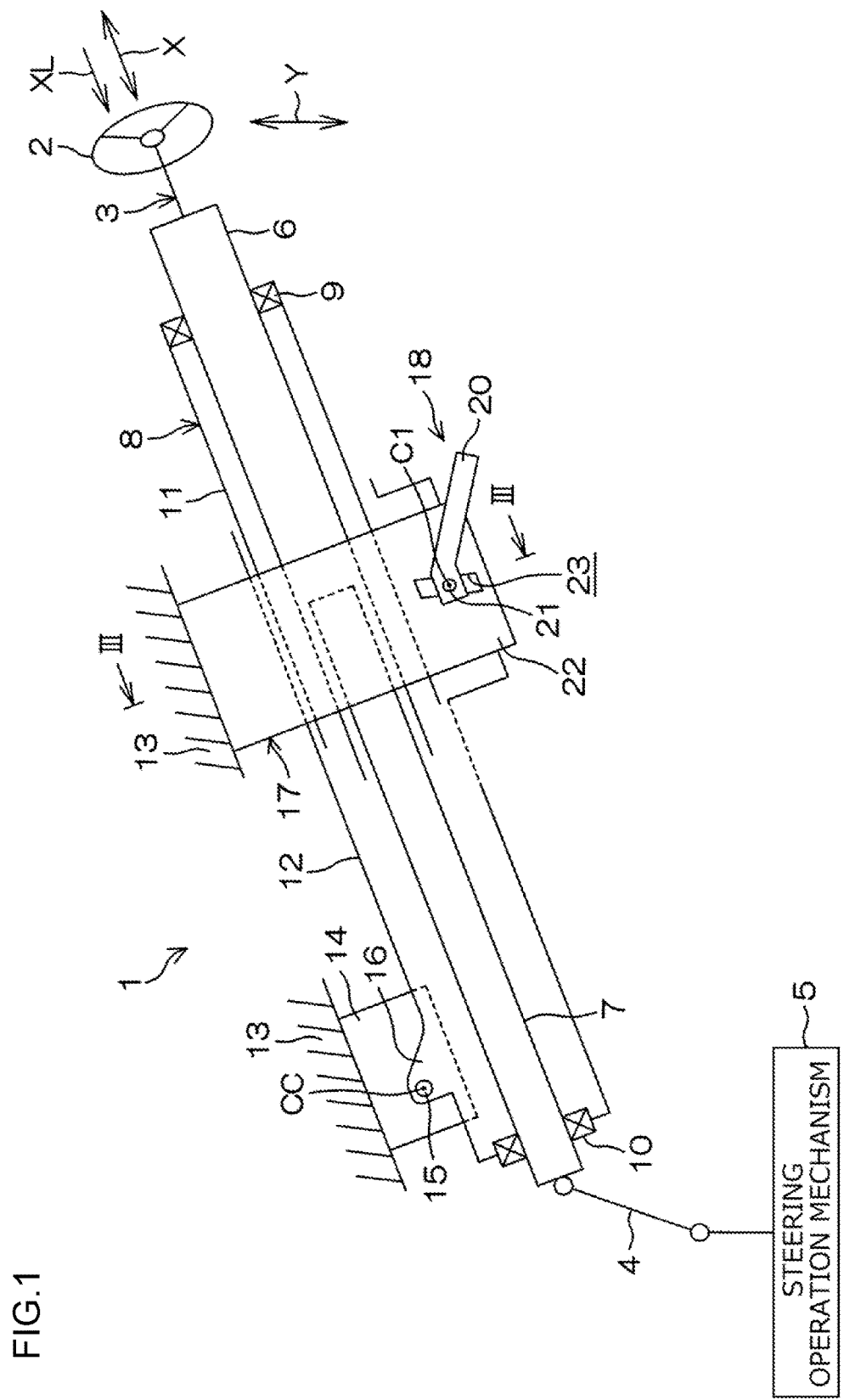
FIG. 1 is a partially cutaway schematic side view depicting a schematic configuration of a steering system in an embodiment of the present invention.

Embodiments of the present invention will be described with reference to the attached drawings. FIG. 1 is a partially cutaway schematic side view depicting a schematic configuration of a steering system in an embodiment of the present invention. As seen in FIG. 1, a steering system 1 includes a steering shaft 3 and a steering operation mechanism 5. One end (an upper end in an axial direction) of the steering shaft 3 is coupled to a steering member 2 such as a steering wheel. The steering operation mechanism 5 is coupled to the steering shaft 3 via an intermediate shaft 4 or the like.

The steering operation mechanism 5 is, for example, a rack-and-pinion mechanism that turns steered wheels (not depicted in the drawings) in conjunction with operation of the steering member 2. Rotation of the steering member 2 is transmitted to the steering operation mechanism 5 via the steering shaft 3, the intermediate shaft 4, and the like. The rotation transmitted to the steering operation mechanism 5 is converted into axial motion of a rack shaft not depicted in the drawings. Consequently, the steered wheels are turned.

The steering shaft 3 has a tubular upper shaft 6 and a tubular lower shaft 7 fitted together by, for example, spline fitting or serration fitting so as to be slidable relative to each other. The steering member 2 is coupled to one end of the upper shaft 6. The steering shaft 3 can be extended and contracted in an axial direction X. The steering system 1 includes a hollow column jacket 8 that supports the steering shaft 3 such that the steering shaft 3 is rotatable. The steering shaft 3 passes through the column jacket 8. The steering shaft 3 is rotatably supported by the column jacket 8 via a plurality of bearings 9 and 10.

The column jacket 8 has a tubular inner jacket 11 that is, for example, an upper jacket and a tubular outer jacket 12 that is, for example, a lower jacket, and the inner jacket 11 and the outer jacket 12 are fitted together so as to be slidable relative to each other. The column jacket 8 can be extended and contracted in the axial direction X. The upper, inner jacket 11 is coupled to an upper shaft 6 via the bearing 9 so as to be movable along with the upper shaft 6 in the axial direction X. The lower, outer jacket 12 supports the lower shaft 7 via the bearing 10 such that the lower shaft 7 is rotatable.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the outer jacket 12 and is rotatably supported by the tilt center shaft 15. The column jacket 8 and the steering shaft 3 can be pivoted (tilted) in a tilt direction Y using, as a supporting point, a tilt center CC that is a central axis of the tilt center shaft 15.

The position of the steering member 2 can be adjusted by pivoting (tilting) the steering shaft 3 and the column jacket 8 around the tilt center CC (what is called tilt adjustment). The position of the steering member 2 can also be adjusted by extending or contracting the steering shaft 3 and the column jacket 8 in the axial direction X (what is called telescopic adjustment). The steering system 1 includes a bracket 17 and a clamp mechanism 18. The bracket 17 is fixed to the vehicle body 13. The clamp mechanism 18 clamps a pair of clamped portions 19 (corresponding to clamped side plates) integrated with the outer jacket 12, to achieve tilt locking and telescopic locking.

Figure 2:
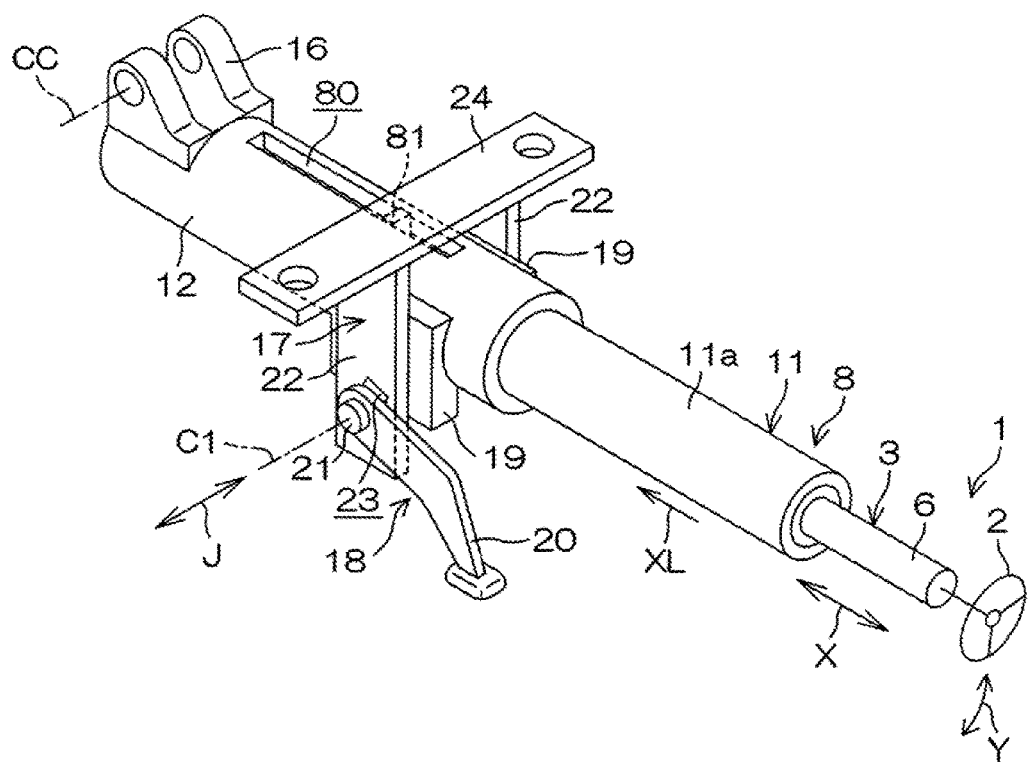
FIG. 2 is a schematic perspective view of the steering system in the first embodiment.
Figure 4:
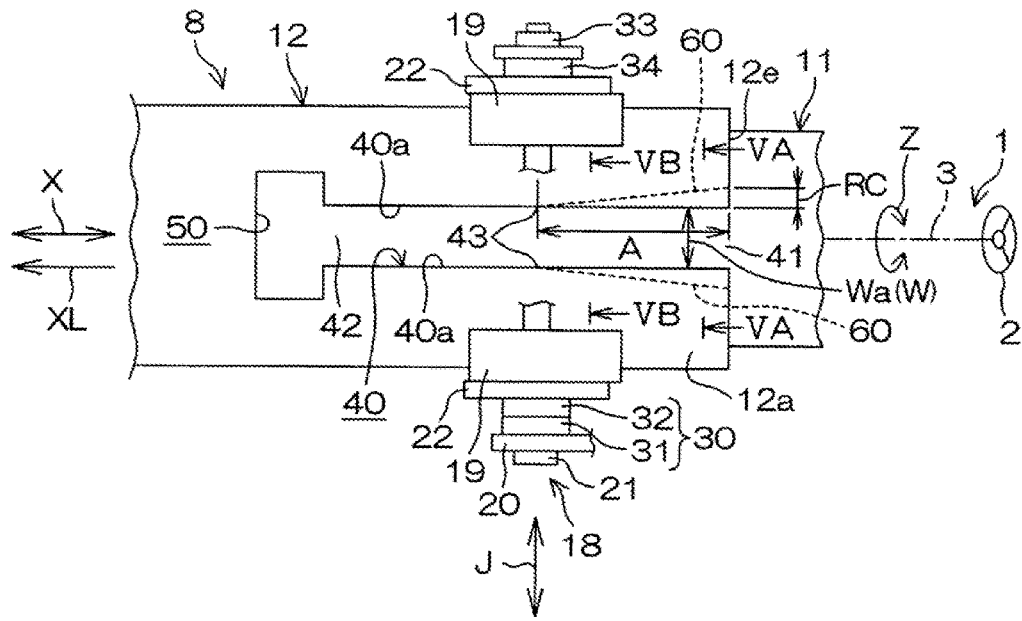
FIG. 4 is a schematic bottom view of an important part of the steering system in the first embodiment as viewed from below in a tilt direction.

As depicted in FIG. 1 and FIG. 2 that is a schematic perspective view, the clamp mechanism 18 includes an operation lever 20 and a clamping shaft 21. The operation lever 20 is an operation member rotationally operated by a driver. The clamping shaft 21 can rotate together with the operation lever 20. A central axis C1 of the clamping shaft 21 corresponds to a center of rotation of the operation lever 20. As depicted in FIG. 4 that is a schematic bottom view, a slit 40 is formed in the outer jacket 12. This enables the outer jacket 12 to be elastically reduced in diameter.

The slit 40 extends straight from an opening end 41 formed at a jacket end 12e of the outer jacket 12 to an extension end 42 apart from the opening end 41 in the axial direction X. An attachment hole 50 that allows attachment of an attached component connects to a portion of the extension end 42 on a downward side XL in the axial direction. The attachment hole 50 may be an attachment hole that allows attachment of a key lock apparatus (attached component). The attachment hole 50 may be an attachment hole that allows attachment of a bracket (attached component) for attachment of a column cover.

Figure 5A:
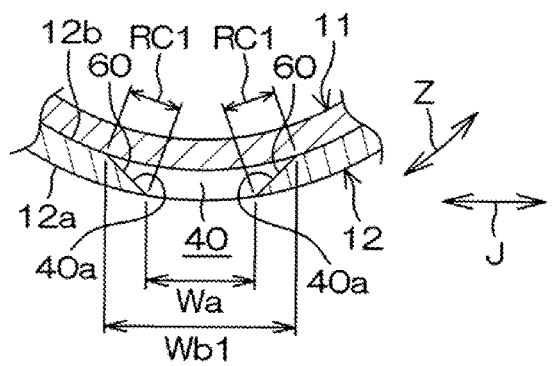
FIG. 5A is a partial sectional view of an outer jacket corresponding to a VA-VA section in FIG. 4.
Figure 5B:
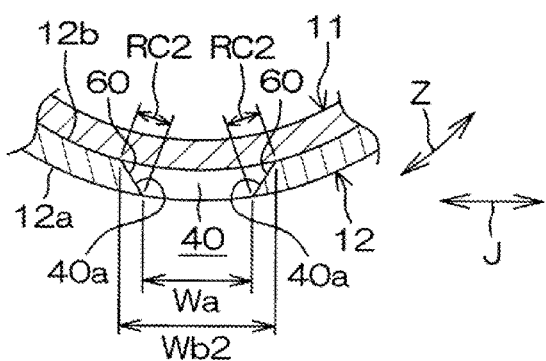
FIG. 5B is a partial sectional view of the outer jacket corresponding to a VB-VB section in FIG. 4.

At each of a pair of inner edges 40a of the slit 40 in the outer jacket 12, a recessed portion 60 is formed in an axial area A from the opening end 41 to an area end 43 apart from the opening end 41 by a predetermined distance in the axial direction X. FIG. 5A is a partial sectional view of the outer jacket 12 corresponding to a VA-VA section in FIG. 4. FIG. 5B is a partial sectional view of the outer jacket 12 corresponding to a VB-VB section in FIG. 4 that is located on the downward side XL of the VA-VA section in the axial direction X.

As depicted in FIG. 5A and FIG. 5B, a slit width W at an outside diameter portion 12a of the outer jacket 12 is constant at a slit width Wa. As depicted in FIG. 5A, the recessed portions 60 are formed in a chamfered manner such that a slit width Wb1 at an inside diameter portion 12b is larger than the slit width Wa at the outside diameter portion 12a (Wb1>Wa).

As depicted in FIG. 5B, the recessed portions 60 are formed in a chamfered manner such that a slit width Wb2 at the bore diameter portion 12b is larger than the slit width Wa at the outside diameter portion 12a (Wb2>Wa). As depicted in FIG. 4, the amount of recess RC of each recessed portion 60 in a circumferential direction Z of the outer jacket 12 continuously decreases from the opening end 41 toward the area end 43. That is, the amount of recess RC2 at the area end 43 depicted in FIG. 5B is smaller than the amount of recess RC1 at the opening end 41 depicted in FIG. 5A (RC2<RC1).

The clamped portions 19 provided on the outer jacket 12 face each other in a clamping shaft direction J that is an axial direction of the clamping shaft 21. The clamped portions 19 are arranged on opposite sides of the slit 40 across an intermediate portion of the slit 40 in the axial direction X. As seen in FIG. 2, the clamp mechanism 18 clamps the bracket 17 to the clamped portions 19 of the outer jacket 12 via the clamping shaft 21 to achieve tilt locking.

The clamp mechanism 18 clamps the clamped portions 19 of the outer jacket 12 to reduce the diameter of the outer jacket 12. The inner jacket 11 is clamped by the outer jacket 12 with a reduced diameter so as to be immovable in the axial direction X. Thus, telescopic locking is achieved. As a result, the position of the steering member 2 is fixed with respect to the vehicle body 13 (see FIG. 1). The clamping shaft 21 passes through a tilting slot 23 formed in each side plate 22 of a pair of side plates 22 of the bracket 17 (FIG. 1 depicts only one side plate 22) and extending in the tilt direction Y.

As depicted in FIG. 2, the outer jacket 12 has a slot 80 extending in the axial direction X. The inner jacket 11 includes an engagement portion 81 provided at a lower end of the inner jacket 11 in the axial direction X to engage with the slot 80. Engagement between the slot 80 and the engagement portion 81 regulates rotation of the inner jacket 11 with respect to the outer jacket 12. During telescopic adjustment and impact absorption, the engagement portion 81 is guided by the slot 80 to move downward in the axial direction X along with the inner jacket 11.

Figure 3:
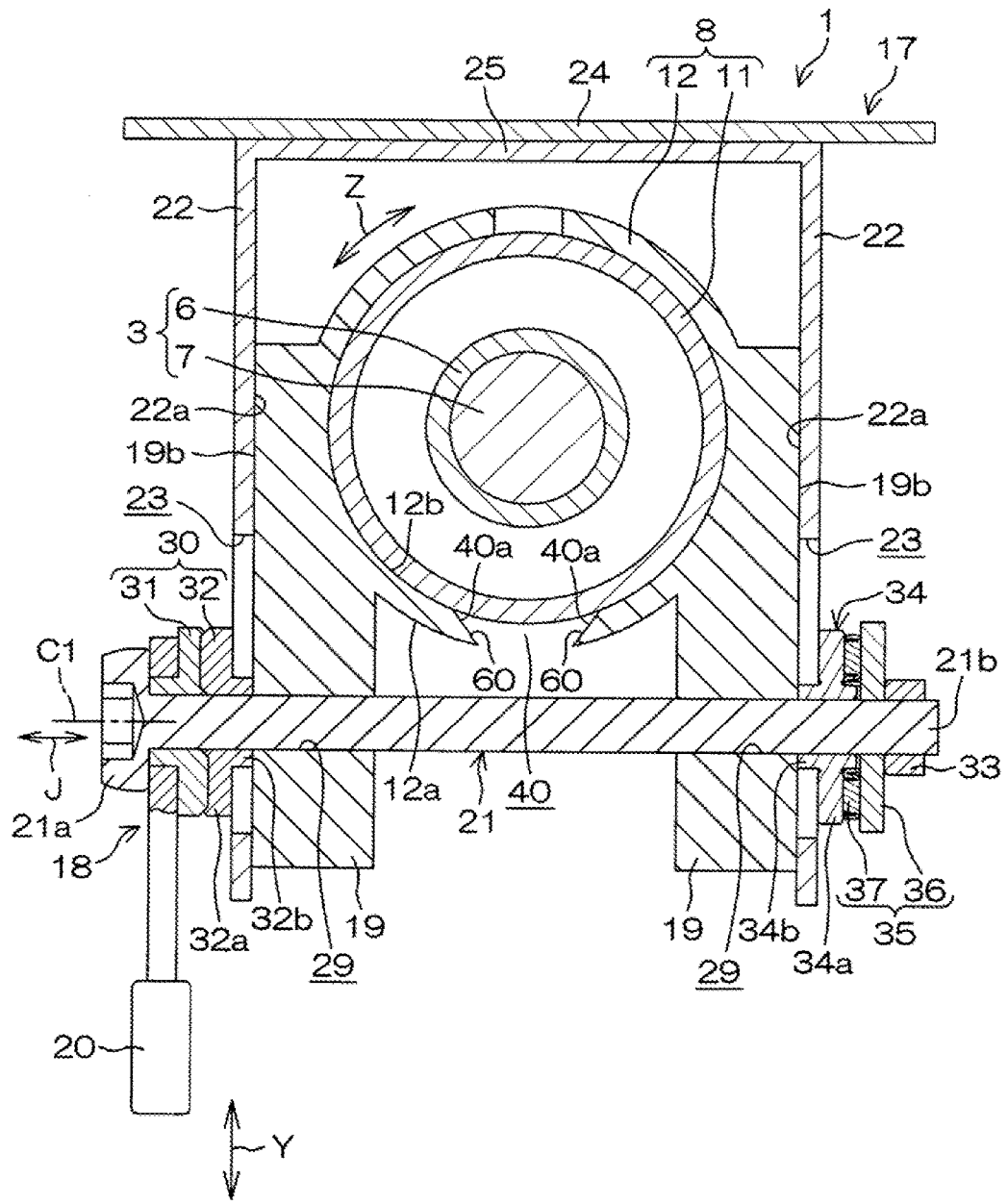
FIG. 3 is a schematic sectional view of the steering system in the first embodiment, corresponding to a sectional view taken along line in FIG. 1.

FIG. 3 is a sectional view taken along line in FIG. 1. As depicted in FIG. 3, the bracket 17 includes an attachment plate 24, a top plate 25, and a pair of side plates 22. The attachment plate 24 is attached to the vehicle body 13. The top plate 25 is fixed along the attachment plate 24. The side plates 22 extend downward from opposite ends of the top plate 25 in the tilt direction Y. The clamped portions 19 of the outer jacket 12 are arranged between the side plates 22 and each shaped like a plate extending along an inner side surface 22a of the corresponding side plate 22. The inner side surface 22a of each of the side plates 22 faces an outer side surface 19b of the corresponding clamped portion 19.

In each of the clamped portions 19 of the outer jacket 12, a clamping shaft through-hole 29 is formed which is a hole through which the clamping shaft 21 is inserted. The clamping shaft 21, the outer jacket 12, the inner jacket 11, and the steering shaft 3 move integrally in the tilt direction Y during tilt adjustment. The clamping shaft 21 is a bolt that is inserted through the tilting slots 23 in the side plates 22 and the clamping shaft through-holes 29 in the clamped portions 19 of the outer jacket 12. A head portion 21a provided at one end of the clamping shaft 21 and having a large diameter is fixed to the operation lever 20 so as to be movable together with the operation lever 20.

The clamp mechanism 18 is interposed between the head portion 21a of the clamping shaft 21 and a first side plate 22. The clamp mechanism 18 further includes a force conversion mechanism 30 that converts an operation torque from the operation lever 20 into an axial force (a clamping force exerted to clamp the side plates 22). The force conversion mechanism 30 includes a rotating cam 31 and a first clamp member 32 that is a non-rotating cam. The rotating cam 31 is coupled to the operation lever 20 so as to be rotatable together with the operation lever 20, which regulates movement of the rotating cam 31 in the clamping shaft direction J with respect to the clamping shaft 21. The first clamp member 32 cam-engages with the rotating cam 31 to clamp the first side plate 22.

The clamp mechanism 18 further includes a nut 33, a second clamp member 34, and an interposition member 35. The nut 33 is screw-threaded over a threaded portion 21b at the other end of the clamping shaft 21. The second clamp member 34 clamps a second side plate 22. The interposition member 35 is interposed between the second clamp member 34 and the nut 33. The interposition member 35 includes a washer 36 and a needle roller bearing 37. The washer 36 is interposed between the nut 33 and the second clamp member 34. The needle roller bearing 37 is interposed between the washer 36 and the second clamp member 34.

The second clamp member 34 and the interposition member 35 are interposed between the nut 33 and the second side plate 22. The rotating cam 31, the first clamp member 32 (non-rotating cam), the second clamp member 34, and the interposition member 35 are supported by an outer periphery of the clamping shaft 21. The first clamp member 32 (non-rotating cam) and the second clamp member 34 have clamp plate portions 32a and 34a and boss portions 32b and 34b, respectively. The clamp plate portions 32a and 34a clamp the corresponding side plates 22. The boss portions 32b and 34b are fitted in the corresponding tilting slots 23. Fitting of the boss portions 32b and 34b in the corresponding tilting slots 23 regulates rotation of the clamp members 32 and 34.

The first clamp member 32 (non-rotating cam) and the second clamp member 34 are supported by the clamping shaft 21 so as to be movable in the clamping shaft direction J. In conjunction with rotation of the operation lever 20 in a lock direction, the rotating cam 31 rotates with respect to the first clamp member 32 (non-rotating cam). Consequently, the first clamp member 32 is moved in the clamping shaft direction J to clamp the side plates 22 of the bracket 17 between (the clamp plate portions 32a and 34a of) the clamp members 32 and 34.

Thus, the side plates 22 of the bracket 17 clamp the corresponding clamped portions 19 of the outer jacket 12. As a result, movement of the outer jacket 12 in the tilt direction Y is regulated to achieve tilt locking. Both the clamped portions 19 are clamped to elastically reduce the diameter of the outer jacket 12 with the slit 40, thus clasping and clamping the inner jacket 11. Consequently, movement of the inner jacket 11 in the axial direction X is regulated to achieve telescopic locking.

In the present embodiment, the amount of recess (RC1, RC2) of the recessed portion 60 formed at the inner edge 40a of the slit 40 extending straight in the axial direction X continuously decreases from the opening end 41 toward the area end 43 in the axial area A. Thus, a clasping force exerted on the inner jacket 11 by the outer jacket 12 can be restrained from varying in accordance with an axial position.

That is, when a slit extending straight is formed in the outer jacket 12, the outer jacket 12 is easy to deflect at the opening end of the slit, which makes the clasping force exerted on the inner jacket 11 relatively large. On the other hand, the outer jacket 12 is difficult to deflect at the extension end of the slit, which makes the clasping force exerted on the inner jacket 11 relatively small. In contrast, in the present embodiment, the amount of recess at the opening end 41 is set larger than the amount of recess at the area end 43. Thus, the clasping force exerted at the opening end 41 of the outer jacket 12 is reduced to restrain the clasping force from varying in accordance with the axial position.

The clasping force can be restrained from locally increasing (that is, the clasping force is made uniform). Thus, an impact absorbing load can be stably generated at the time of a secondary collision. Furthermore, possible defects can be inhibited, such as running out of grease between the jackets 11 and 12 and peel-off of coating layers provided in sliding portions of the jackets 11 and 12. The clasping force can be easily adjusted without the need for separate members by changing the specifications of the slit such as the length of the axial area A in the axial direction X and the amount of recess of the recessed portion 60.

Figure 6:
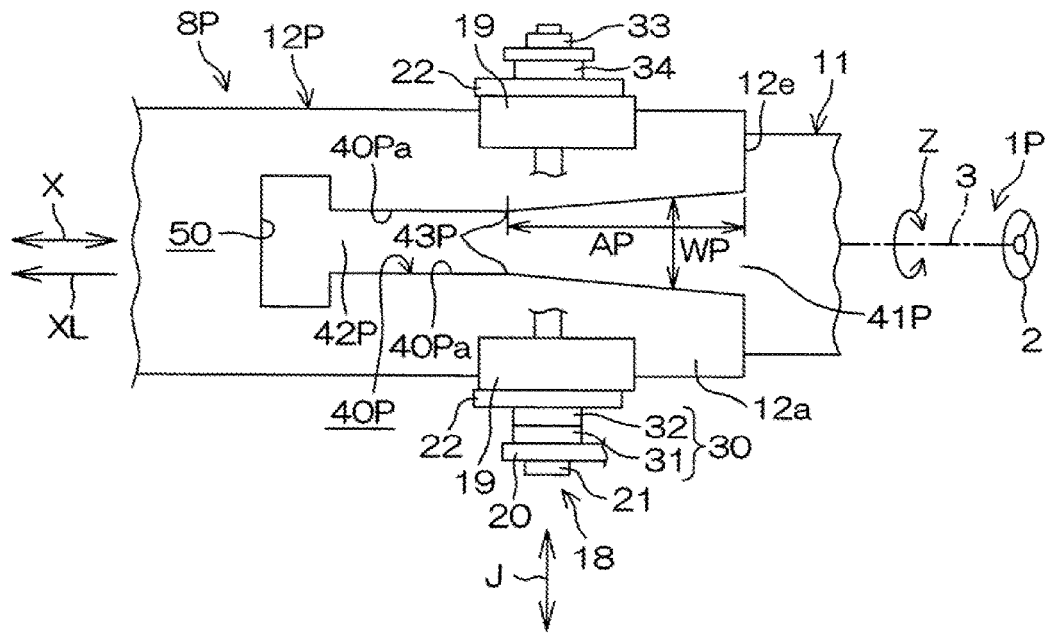
FIG. 6 is a schematic bottom view of an important part of a steering system in a second embodiment as viewed from below in the tilt direction.

An inner periphery of a portion of the outer jacket 12, which is on the opposite side from the slit 40, reliably comes into contact with an outer periphery of the inner jacket 11. Consequently, a large fitting length can be achieved between the inner jacket 11 and the outer jacket 12, allowing the rigidity of the jackets 11, 12 to be improved. The outer jacket 12 need not have a recess in the portion thereof that is on the opposite side from the slit 40. Thus, the appropriate thickness can be easily achieved to provide the outer jacket 12 with an appropriate strength for a secondary collision. FIG. 6 is a schematic bottom view of an important part of a steering system 1P according to a second embodiment of the present invention. The steering system 1P in the second embodiment in FIG. 6 is different from the steering system 1 in the first embodiment in FIG. 4 mainly in the following configuration. In the steering system 1P, a slit 40P formed in an outer jacket 12P of a column jacket 8P extends to an extension end 42P that is apart, in the axial direction X, from an opening end 41P formed at a jacket end 12e.

In an axial area AP from the opening end 41P of the slit 40P to an area end 43P apart from the opening end 41P in the axial direction X, a slit width WP of the slit 40P gradually decreases from the opening end 41P toward the area end 43P. Components of the second embodiment in FIG. 6 that are the same as those of the first embodiment in FIG. 4 are denoted by the same reference numerals as those of the first embodiment in FIG. 4.

Figure 7:
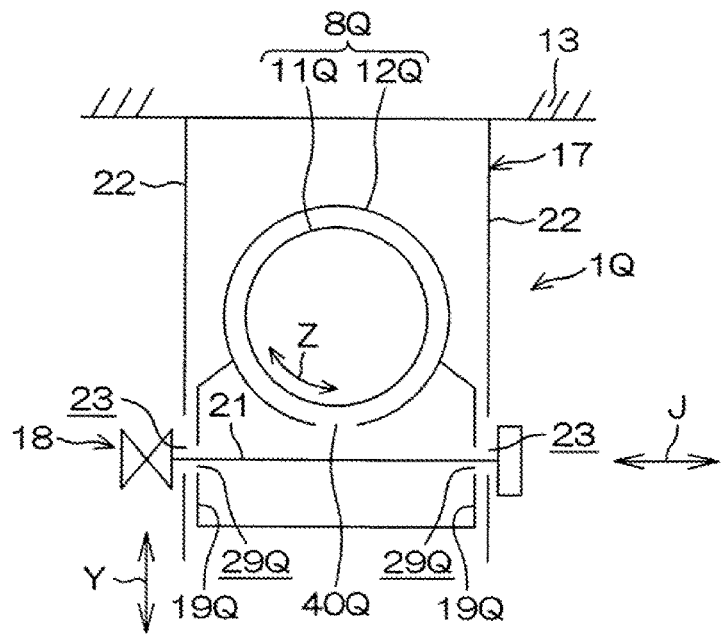
FIG. 7 is a schematic sectional view of a steering system in a third embodiment.

The second embodiment can produce the same effects as those of the first embodiment. That is, for example, the clasping force exerted on the inner jacket 11 by an outer jacket 12P can be restrained from varying in accordance with the axial position. FIG. 7 is a schematic sectional view of a steering system 1Q in a third embodiment of the present invention. The steering system 1Q in the third embodiment in FIG. 7 is different from the steering system 1 in the first embodiment in FIG. 3 mainly in the following configuration.

As depicted in FIG. 7, a column jacket 8Q includes a lower, inner jacket 11Q and an upper, outer jacket 12Q with a slit 40Q. The outer jacket 12Q slides in the axial direction relative to the inner jacket 11Q to perform telescopic adjustment. The slit 40Q has the same configuration as that of the slit 40 in the first embodiment (see FIGS. 4 and 5) or that of the slit 40P in the second embodiment (see FIG. 6).

The clamp mechanism 18 allows the side plates 22 fixed to the vehicle body 13 to clamp a pair of clamped portions 19Q (corresponding to clamped side plates) integrated with the outer jacket 12Q. Clamping shaft through-holes 29Q that are formed in the clamped portions 19Q and through which the clamping shaft 21 is inserted are formed as slots extending in a telescopic direction (that is an axial direction of the column jacket 8Q and that is orthogonal to the sheet of FIG. 7).

Components of the second embodiment in FIG. 7 that are the same as those of the first embodiment in FIG. 3 are denoted by the same reference numerals as those of the first embodiment. The third embodiment can produce the same effects as those of the first embodiment or the second embodiment. The present invention is not limited to the above-described embodiments. In the first embodiment in FIG. 4, the amount of recess may decrease in a stepped manner from the opening end 41 toward the area end 43.

In the second embodiment in FIG. 6, the slit width WP may decrease in a stepped manner from the opening end 41P toward the area end 43. In the above-described embodiments, the area ends 43 and 43P may reach the extension ends 42 and 42P, respectively. In the above-described embodiments, the slit is open downward in the tilt direction. However, the slit may be open upward in the tilt direction.

Various other modifications may be made to the embodiments of the present invention within the scope of the claims.

What is claimed is:

1. A steering system comprising:
a column jacket including:
   a tubular inner jacket; and
   a tubular outer jacket that is externally fitted over the inner jacket so as to be slidable in an axial direction relative to the inner jacket and that is provided with a slit extending straight from an opening end formed at a jacket end to an extension end in the axial direction such that the outer jacket is elastically reduced in diameter to hold the inner jacket,
the column jacket supporting a steering shaft such that the steering shaft is rotatable; and
a clamp mechanism that clamps a pair of clamped portions to cause the outer jacket to clamp the inner jacket such that the inner jacket is immovable in the axial direction, wherein
in an axial area from the opening end of the slit to an area end apart from the opening end in the axial direction, a recessed portion is formed at an inner edge of the slit such that a slit width at an inside diameter portion of the outer jacket at a position along the axial direction is larger than a slit width at an outside diameter portion of the outer jacket at the position,
an amount of recess of the recessed portion in a circumferential direction of the outer jacket decreases continuously or in a stepped manner from the opening end to the area end, and
the pair of clamped portion is integrated with the outer jacket.

2. A steering system comprising:
a column jacket including:
   a tubular inner jacket; and
   an outer jacket that is externally fitted over the inner jacket so as to be slidable in an axial direction relative to the inner jacket and that is provided with a slit extending from an opening end formed at a jacket end to an extension end in the axial direction such that the outer jacket is elastically reduced in diameter to hold the inner jacket,
the column jacket supporting a steering shaft such that the steering shaft is rotatable; and
a clamp mechanism that clamps a pair of clamped portions to cause the outer jacket to clamp the inner jacket such that the inner jacket is immovable in the axial direction, wherein
in an axial area from the opening end of the slit to an area end apart from the opening end in the axial direction, a slit width of the slit gradually decreases from the opening end toward the area end, and
the pair of clamped portions is monolithically integrated with the outer jacket.

* * * * *